United States Patent
Zhou et al.

(10) Patent No.: US 11,887,287 B1
(45) Date of Patent: Jan. 30, 2024

(54) PRODUCTION MONITORING AND ANALYSIS METHOD BASED ON AN IMAGE DATA ALGORITHM

(71) Applicants: Changshu Institute of Technology, Suzhou (CN); Pengchen New Material Technology Co., Ltd., Suzhou (CN)

(72) Inventors: Yi Zhou, Suzhou (CN); Zhe Yu, Suzhou (CN); Yong Tan, Suzhou (CN); Kangbo Yu, Suzhou (CN); Fan Lin, Suzhou (CN); Sheng Chang, Suzhou (CN); Jiuchang Qiao, Suzhou (CN)

(73) Assignees: CHANGSHU INSTITUTE OF TECHNOLOGY, Suzhou (CN); PENGCHEN NEW MATERIAL TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/373,318

(22) Filed: Sep. 27, 2023

(30) Foreign Application Priority Data

Nov. 23, 2022 (CN) .......................... 202211471188.9

(51) Int. Cl.
*G06T 5/40* (2006.01)
*G06V 10/764* (2022.01)
*G06T 7/136* (2017.01)

(52) U.S. Cl.
CPC ................ *G06T 5/40* (2013.01); *G06T 7/136* (2017.01); *G06V 10/764* (2022.01); *G06T 2207/10024* (2013.01)

(58) Field of Classification Search
CPC . G06T 5/40; G06T 7/136; G06T 2207/10024; G06V 10/764
See application file for complete search history.

(56) References Cited

U.S. PATENT DOCUMENTS

| 8,805,072 B2 * | 8/2014 | Kakino | ................ G06T 7/136 382/172 |
| 9,704,057 B1 * | 7/2017 | Elton | .................... G06F 18/245 |

* cited by examiner

Primary Examiner — Phuoc Tran
(74) Attorney, Agent, or Firm — Bayramoglu Law Offices LLC

(57) ABSTRACT

A production monitoring and analysis method based on an image data algorithm includes: obtaining a reconstructed gray histogram according to a gray image of an image where a product identification code is located; obtaining a segmentation threshold of an Otsu algorithm for segmenting the reconstructed gray histogram, obtaining the adjustment of the gray level in the sub-gray histogram according to the number of pixels corresponding to each gray level in the reconstructed gray histogram and the segmentation threshold, correcting the sub-gray histogram to obtain a corrected sub-gray histogram according to the adjustment of the gray level in the sub-gray histogram, the lateral segmentation threshold of the sub-gray histogram, and all the gray levels greater than the lateral segmentation threshold, and obtaining an enhanced gray image according to the corrected sub-gray histogram. The method avoids the loss of original information when using histogram equalization for image enhancement.

5 Claims, 1 Drawing Sheet

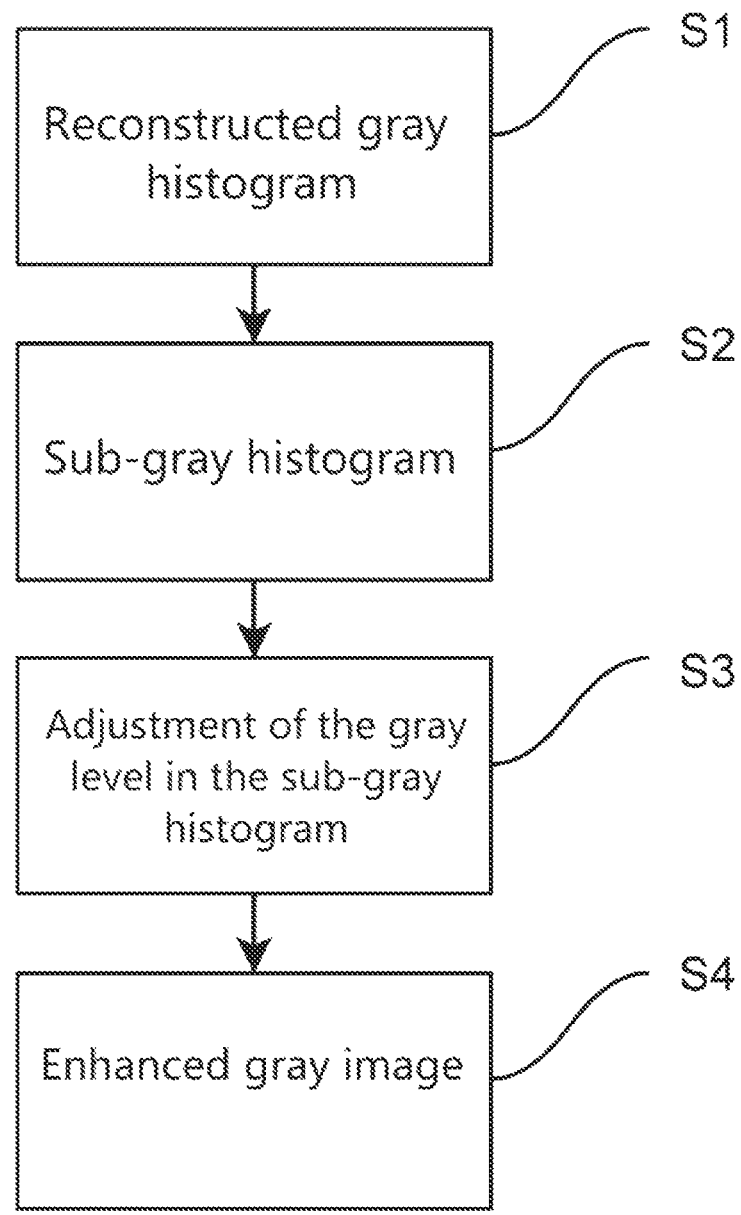

PRODUCTION MONITORING AND ANALYSIS METHOD BASED ON AN IMAGE DATA ALGORITHM

CROSS REFERENCE TO THE RELATED APPLICATIONS

This application is based upon and claims priority to Chinese Patent Application No. 202211471188.9, filed on Nov. 23, 2022, the entire contents of which are incorporated herein by reference.

TECHNICAL FIELD

The invention relates to the field of image processing technology, in particular to a production monitoring and analysis method based on an image data algorithm.

BACKGROUND

Production is a core of manufacturing enterprises, and all aspects of life are inseparable from production, products must be monitored and analyzed in each industry when producing products, among them, production monitoring and analysis is used for classifying the produced products, generally speaking, the scanning equipment scans the identification code on the surface of the product after production to classify the product when classifying. For example, when classifying the products on the conveyor belt, it is often necessary to classify the products by identifying the identification code on the product, and the identification code is often far away from the camera. Therefore, the identification code in the image is not clear and the product cannot be classified, so it is very important to enhance the quality of the image to ensure the accurate classification of products.

The existing technology often uses histogram equalization for image enhancement, this method is a more common and simple technology, and it has a better enhancement effect. The main idea is to transform the histogram distribution of an image into an approximate uniform distribution through a cumulative distribution function. The gray range of the original image is expanded to enhance the contrast of the image; however, the direct stretching of the image by histogram equalization will cause the image to be over-stretched, resulting in the loss of a large amount of detailed information in the image, that is, the original information is lost, resulting in the loss of identification code information in the image, thus affecting the classification of products.

SUMMARY

The invention provides a production monitoring and analysis method based on image data algorithm to solve the problem that the original information is lost when using the existing histogram equalization for image enhancement.

A production monitoring and analysis method based on an image data algorithm of the invention adopts the following technical solution:

obtaining a gray image of an image where a product identification code is located, obtaining a reconstructed gray level of each pixel in a gray histogram according to a mean value of the gray level, a maximum gray level, a minimum gray level, and a gradient of each pixel in the gray image, obtaining a reconstructed gray histogram according to the reconstructed gray level of each pixel in the gray histogram;

a specific expression of the reconstructed gray level of each pixel is as follows:

$$H(i, j) = \frac{x_{max} - x_{min}}{255} \times [|x_{ij} - \bar{x}| * G(i, j)] \times x_{ij}$$

in the formula: $H(i,j)$ represents a reconstructed gray level of a pixel $(i, j)$, $x_{max}$ represents a maximum gray level, $x_{min}$ represents a minimum gray level, $x_{ij}$ represents a gray level of a pixel $(i, j)$, $\bar{x}$ represents a mean value of the gray level, $G(i,j)$ represents a gradient of the pixel $(i, j)$ in the gray image;

obtaining a segmentation threshold of an Otsu algorithm for segmenting the reconstructed gray histogram, correcting the segmentation threshold to obtain a new segmentation threshold according to several pixels corresponding to each gray level in the reconstructed gray histogram, segmenting the reconstructed gray histogram to obtain a sub-gray histogram according to the new segmentation threshold;

obtaining a lateral segmentation threshold of the sub-gray histogram according to the total number of pixels in each sub-gray histogram and a length of a gray level interval of the sub-gray histogram, obtaining an adjustment of the gray level in the sub-gray histogram according to the lateral segmentation threshold of the sub-gray histogram and all the gray levels greater than the lateral segmentation threshold.

correcting the sub-gray histogram to obtain a corrected sub-gray histogram according to the adjustment of the gray level in the sub-gray histogram, the lateral segmentation threshold of the sub-gray histogram, and all the gray levels greater than the lateral segmentation threshold, obtaining an enhanced gray image according to the corrected sub-gray histogram, identifying a recognition code in the enhanced gray image and completing the product classification.

Furthermore, the specific expression of the new segmentation threshold is as follows:

$$Sp = x_T + \frac{\sum n_q q}{\sum n_q}$$

in the formula: $Sp$ represents the new segmentation threshold, $n_q$ represents the number of gray levels corresponding to a pixel q in the reconstructed gray histogram, $\Sigma n_q q$ represents the area corresponding to the gray level in the reconstructed gray histogram, and $x_T$ represents the segmentation threshold.

Furthermore, the lateral segmentation threshold of the sub-gray histogram is determined as follows:

obtaining the lateral segmentation threshold of the sub-gray histogram according to a ratio of the total number of corresponding pixels in the sub-gray histogram to the length of the gray level interval of the sub-gray histogram.

Furthermore, a specific expression of the adjustment of the gray level in the sub-gray histogram is as follows:

$$R = \frac{\sum (n_q - T_i)}{L}$$

In the formula, R represents the adjustment of the gray level in the sub-gray histogram, $T_i$ represents the lateral segmentation threshold of the sub-gray histogram, L represents the gray level interval corresponding to all the gray levels greater than the lateral segmentation threshold in the sub-gray histogram, and $n_p$ represents all the gray levels greater than the lateral segmentation threshold in the sub-gray histogram.

Furthermore, a method for obtaining the corrected sub-gray histogram is as follows:
  obtaining the corrected gray level according to the adjustment of the gray level in the sub-gray histogram, the lateral segmentation threshold of the sub-gray histogram, and all the gray levels greater than the lateral segmentation threshold;
  obtaining a corrected sub-gray histogram according to the corrected gray level.

Furthermore, an enhanced gray image is determined by the following method:
  calculating a union set of the corrected sub-gray histograms to obtain a merged sub-gray histogram;
  obtaining the enhanced gray image according to the merged sub-gray histogram.

The beneficial effect of the invention is that the gray histogram of the image to be enhanced is first obtained, and the gray level in the gray histogram is laterally stretched to obtain the reconstructed gray histogram, each gray level is given a stretching weight in the lateral stretching according to the difference of each gray level so that the integrity of the original information is guaranteed when the gray histogram is laterally stretched. Secondly, the invention performs a longitudinal transformation on the reconstructed gray histogram. By re-assigning the gray level greater than the lateral segmentation threshold, the gray value is corrected to obtain the gray histogram, which improves the contrast of the original gray image and realizes the enhancement of the original gray image.

BRIEF DESCRIPTION OF THE DRAWINGS

In order to explain the technical solution in the embodiment or the existing technology of the invention more clearly, the drawings that need to be used in the embodiment or the existing technology description are introduced briefly in the following. Obviously, the drawings in the following description are only some embodiments of the invention. For ordinary technicians in this field, they can also obtain other drawings based on these drawings without paying creative labor.

FIGURE is a flow chart of the embodiment of the production monitoring and analysis method based on the image data algorithm of the invention.

DETAILED DESCRIPTION OF THE EMBODIMENTS

The drawings of the embodiment of the invention will be combined with the following content to clearly and completely describe the technical solution of the embodiment of the invention. Obviously, the described embodiment is only a part of the embodiment of the invention, not all of the embodiments. Based on the embodiment in the invention, all other embodiments obtained by ordinary technicians in this field without making creative labor belong to the scope of protection of the invention.

An embodiment of a production monitoring and analysis method based on an image data algorithm of the invention, as shown in FIGURE, includes:
  S1, a gray image of an image where a product identification code is located is obtained, a reconstructed gray histogram is obtained after reconstructing the gray histogram according to a mean value of the gray level, a maximum gray level, a minimum gray level and a gradient of each pixel in the gray image.

The specific steps to obtain the gray image of the image to be enhanced are as follows: A camera is set on one side of the conveyor belt, and the product on this side is pasted by the identification code, and the images of the product pasted by the identification code on the side of the conveyor belt are collected. However, in the process of collecting the image, the light needs to be uniformly distributed when collecting the images to prevent the reflection of the product surface. The direction of light irradiation is in an overhead view, and multiple light sources are required to form a uniform light that is irradiated on the surface of the product, the obtained images are processed by a gray processing to obtain the corresponding gray images.

The specific steps to obtain the reconstructed gray histogram are as follows: the mean value of the gray level $\bar{x}$, the maximum gray level $x_{max}$, the minimum gray level $x_{min}$, and the gradient of each pixel in the gray image G(i,j) are obtained, according to the mean value of the gray level $\bar{x}$, the maximum gray level $x_{max}$, the minimum gray level $x_{min}$ and the gradient of each pixel in the gray image G(i,j), the reconstructed gray level of each pixel in the gray histogram is obtained. According to the reconstructed gray level of each pixel in the gray histogram, the reconstructed gray histogram is obtained. The specific expression of the reconstructed gray level of each pixel is as follows:

$$H(i, j) = \frac{x_{max} - x_{min}}{255} \times [|x_{ij} - \bar{x}| * G(i, j)] \times x_{ij}$$

in the formula H(i,j) represents a reconstructed gray level of a pixel (i,j) $x_{max}$ represents a maximum gray level, $x_{min}$ represents a minimum gray level, $x_{ij}$ represents a gray level of a pixel (i, j), $\bar{x}$ represents an mean value of the gray level, G(i,j) represents a gradient of the pixel (i,j) in the gray image; according to the reconstructed gray level of each pixel, the gray histogram is reconstructed to obtain the reconstructed gray histogram, $(x_{ij} - \bar{x}_{ij})$ represents the gray value of the pixel (i,j) minus the mean value of the gray level of the gray histogram, which represents the difference between the gray value and the mean value of this pixel, the purpose is to represent the gray position of the gray value, thus, the weight given to it is different when stretching; in order to represent the distribution of gray, $$\frac{x_{max} - x_{min}}{255}$$

represents the proportion of gray level intervals in the histogram; $[|x_{ij} - \bar{x}| * G(i,j)]$ represents the weight when gray value is $x_{ij}$, the weight is set according to the gray value of the pixel point and the change degree of the pixel point at the position, because the gray value of the pixel point at the edge changes greatly, the gradient is large, and a larger weight is set.

Among them, the recognition code is an important area in the gray image, therefore, for the gray histogram in a smaller gray range, the key information of the important area is given a larger weight when stretching, so the effect of stretching is more obvious, the weight of the pixel (i,j) is multiplied by the mapping function and the gray difference, the purpose is to indicate whether the pixel is in the area where the gray gradient changes greatly. If the pixel is in the area with a large gray gradient, a larger weight is given, and then the pixel is transformed to make the degree of stretching in the gray histogram greater, after stretching, the number of gray levels increases, and the stretching effect of pixels with larger weight gray values becomes more obvious, the recognition code in the image becomes more prominent. For the area with a smaller weight, the stretching effect is not obvious, so the contrast of the image increases.

The gray image is laterally stretched by reconstructing the gray histogram, the purpose of lateral stretching is to obtain a more obvious gray image in the important area, but it is not enough to perform lateral stretching only, because the key pixels in the gray image are given a larger weight during lateral stretching, the stretched area is limited, but in order to highlight the stretching of the important area, the gray histogram needs to be longitudinally transformed to make the entire important area more prominent after the gray image is laterally stretched, the gray value is large and the small area changes significantly. It may cause the gray value of a target area in the gray image to be close to the background gray value, longitudinal stretching is required in order to increase the difference between the background and the target.

S2, a segmentation threshold of an Otsu algorithm for segmenting the reconstructed gray histogram is obtained, the segmentation threshold is corrected to obtain a new segmentation threshold according to several pixels corresponding to each gray level in the reconstructed gray histogram, the reconstructed gray histogram is segmented to obtain a sub-gray histogram according to the new segmentation threshold.

In the longitudinal transformation of the histogram, the basic idea is to weaken the pixels of the gray value of the larger peak, because the number of pixels is represented by the longitudinal axis of the histogram, when the peak of the histogram is weakened, the pixels with more concentrated gray value in the image will be reduced, so that many unrelated pixels of the image will be reduced, thus highlighting the enhanced area.

The distribution of pixels in the region of the gray image with low illumination is often too concentrated in the reconstructed gray histogram, which leads to the appearance of spikes in the global reconstructed gray histogram, thus inducing an over-enhancement and loss of detail information, therefore, the spikes of the reconstructed gray histogram are removed. Firstly, the reconstructed gray histogram is segmented to obtain two sub-gray histograms, and then the Otsu threshold segmentation algorithm is used to obtain the segmentation threshold $x_T$ of the reconstructed gray histogram, and then the segmentation threshold $x_T$ is corrected, the specific expression is as follows:

$$Sp = x_T + \frac{\sum n_q q}{\sum n_q}$$

in the formula: Sp represents the new segmentation threshold, $n_q$ represents the number of gray levels corresponding to a pixel q in the reconstructed gray histogram, $\Sigma n_q q$ represents the area corresponding to the gray level in the reconstructed gray histogram, and $x_T$ represents the segmentation threshold.

Among them, the reconstructed gray histogram is divided according to the distribution of gray value, but the distribution of the number of pixels corresponding to each gray value needs to be considered, when determining the segmentation point, the number of pixels of any peak cannot be divided too much, which will lead to the weakening transition of another peak when the histogram is transformed, resulting in a serious loss of information in the gray image.

S3, a lateral segmentation threshold of the sub-gray histogram is obtained according to the total number of pixels in each sub-gray histogram and a length of a gray level interval of the sub-gray histogram, an adjustment of the gray level in the sub-gray histogram is obtained according to the lateral segmentation threshold of the sub-gray histogram and all the gray levels greater than the lateral segmentation threshold.

After determining the new segmentation threshold of the reconstructed gray histogram, the reconstructed gray histogram is divided into two sub-gray histograms. Then it is necessary to find the segmentation threshold at the peak of the sub-gray histogram, that is, the lateral segmentation threshold. The pixels that exceed the lateral segmentation threshold are re-assigned, and finally, the purpose of correcting the sub-gray histogram is achieved. The specific expression of the lateral segmentation threshold is as follows:

$$T_i = \frac{N_i}{lm_i}$$

In the formula: $T_i$ represents the lateral segmentation threshold in the sub-gray histogram, $N_i$ represents the total number of pixels in the sub-gray histogram, and $lm_i$ represents the gray level interval length in the sub-gray histogram.

Among them, the gray distribution of the sub-gray histogram is characterized by the ratio of the total number of corresponding pixels in the sub-gray histogram to the gray level interval length of the sub-gray histogram. Therefore, the gray distribution of the sub-gray histogram is used as the lateral segmentation threshold of the sub-gray histogram.

All the gray levels in the sub-gray histogram greater than the lateral segmentation threshold are obtained, according to the gray level interval corresponding to all the gray levels in the sub-gray histogram greater than the lateral segmentation threshold and all the gray levels in the sub-gray histogram greater than the lateral segmentation threshold, all the gray levels in the sub-gray histogram greater than the lateral segmentation threshold are adjusted to obtain the gray level adjustment of the sub-gray histogram. The specific expression is as follows:

$$R = \frac{\sum (n_q - T_i)}{L}$$

In the formula, R represents the adjustment of the gray level in the sub-gray histogram, $T_i$ represents the lateral segmentation threshold of the sub-gray histogram, L represents the gray level interval corresponding to all the gray levels greater than the lateral segmentation threshold in the sub-gray histogram, and $n_p$ represents all the gray levels greater than the lateral segmentation threshold in the sub-gray histogram.

where the numerator of the formula calculates the sum of the difference between all gray levels greater than the lateral segmentation threshold in the sub-gray histogram and the lateral segmentation threshold, the denominator is the gray level interval corresponding to all gray levels greater than the lateral segmentation threshold in the sub-gray histogram, the ratio of the numerator to the denominator represents a certain gray level of the sub-gray histogram, the gray level represents the average amount of the sub-gray histogram, so the gray level is used as the adjustment of the gray level in the sub-gray histogram.

S4, the sub-gray histogram is corrected to obtain a corrected sub-gray histogram according to the adjustment of the gray level in the sub-gray histogram, the lateral segmentation threshold of the sub-gray histogram, and all the gray levels greater than the lateral segmentation threshold, an enhanced gray image is obtained according to the corrected sub-gray histogram.

According to the adjustment of the gray level in the sub-gray histogram, the lateral segmentation threshold of the sub-gray histogram, and all the gray levels greater than the lateral segmentation threshold, the gray level corrected by the sub-gray histogram is obtained, the specific expression is as follows:

$$Z = \begin{cases} T_i & n_p > T_i - R \\ n_p + R & n_p \leq T_i - R \end{cases}$$

In the formula: $T_i$ represents the lateral segmentation threshold of the sub-gray histogram, $n_p$ represents all the gray levels in the sub-gray histogram that are greater than the lateral segmentation threshold, R represents the adjustment of the gray level in the sub-gray histogram, and Z represents the corrected gray level corresponding to all the gray levels in the sub-gray histogram that are greater than the lateral segmentation threshold.

Among them, when $n_p > T_i - R$, it will be greater than $T_i - R$, and all gray levels greater than the lateral segmentation threshold are assigned to $T_i$, when $n_p \leq T_i - R$, it will be less than or equal to $T_i - R$, and all gray levels greater than the lateral segmentation threshold are assigned to $n_p \pm R$, where $n_p$ represents all gray levels greater than the lateral segmentation threshold, so gray level correspondence is required when assigning values, the lateral segmentation threshold of the sub-gray histogram limits the larger values in the sub-gray histogram to prevent excessive stretching of the gray level, the amount of adjustment increases the proportion of smaller values in the sub-gray histogram, which prevents the merging of gray levels and the loss of detail information to a certain extent, it also plays a role in adjusting the contrast.

The sub-gray histogram is merged to obtain the merged gray histogram, in which the sub-gray histogram is merged to obtain a union set.

The enhanced gray image is obtained according to the merged gray histogram, and the enhanced gray image is scanned to complete the classification of the products in each enhanced gray image.

The beneficial effect of the invention is that the gray histogram of the image to be enhanced is first obtained, and the gray level in the gray histogram is laterally stretched to obtain the reconstructed gray histogram, each gray level is given a stretching weight in the lateral stretching according to the difference of each gray level so that the integrity of the original information is guaranteed when the gray histogram is laterally stretched. Secondly, the invention performs a longitudinal transformation on the reconstructed gray histogram. By re-assigning the gray level greater than the lateral segmentation threshold, the gray value is corrected to obtain the gray histogram, which improves the contrast of the original gray image and realizes the enhancement of the original gray image.

The above content is only the better embodiment of the invention and is not used to limit the invention. Any modification, equivalent replacement, improvement, etc. made within the spirit and principle of the invention shall be included in the protection scope of the invention.

What is claimed is:

1. A production monitoring and analysis method based on an image data algorithm, comprising:

obtaining a gray image of an image where a product identification code is located, obtaining a reconstructed gray level of each pixel in a gray histogram according to a mean value of the gray level, a maximum gray level, a minimum gray level, and a gradient of each pixel in the gray image, and obtaining a reconstructed gray histogram according to the reconstructed gray level of each pixel in the gray histogram;

a specific expression of the reconstructed gray level of each pixel is as follows:

$$H(i,j) = \frac{x_{max} - x_{min}}{255} \times [|x_{ij} - \bar{x}| * G(i,j)] \times x_{ij}$$

wherein H(i,j) represents a reconstructed gray level of a pixel (i,j), $x_{max}$ represents the maximum gray level, $x_{min}$, represents the minimum gray level, $x_{ij}$ represents a gray level of a pixel (i, j), $\bar{x}$ represents the mean value of the gray level, and G(i,j) represents a gradient of the pixel (i,j) in the gray image;

obtaining a segmentation threshold of an Otsu algorithm for segmenting the reconstructed gray histogram, correcting the segmentation threshold to obtain a new segmentation threshold according to several pixels corresponding to each gray level in the reconstructed gray histogram, and segmenting the reconstructed gray histogram to obtain a sub-gray histogram according to the new segmentation threshold;

a specific expression of the new segmentation threshold is as follows:

$$Sp = x_T + \frac{\sum n_q q}{\sum n_q}$$

wherein Sp represents the new segmentation threshold, $n_q$ represents a number of gray levels corresponding to a pixel q in the reconstructed gray histogram, $\Sigma n_q q$ represents an area corresponding to the gray level in the reconstructed gray histogram, and $x_T$ represents the segmentation threshold;

obtaining a lateral segmentation threshold of the sub-gray histogram according to a total number of pixels in each sub-gray histogram and a length of a gray level interval of the sub-gray histogram, and obtaining an adjustment of the gray level in the sub-gray histogram according to the lateral segmentation threshold of the sub-gray histogram and all the gray levels greater than the lateral segmentation threshold; and correcting the sub-gray histogram to obtain a corrected sub-gray histogram according to the adjustment of the gray level in the sub-gray histogram, the lateral segmentation threshold of the sub-gray histogram, and all the gray levels greater than the lateral segmentation threshold, obtaining an enhanced gray image according to the corrected sub-gray histogram, and identifying a recognition code in the enhanced gray image and completing a product classification.

2. The production monitoring and analysis method based on the image data algorithm according to claim 1, wherein the lateral segmentation threshold of the sub-gray histogram is determined as follows:

obtaining the lateral segmentation threshold of the sub-gray histogram according to a ratio of the total number of corresponding pixels in the sub-gray histogram to the length of the gray level interval of the sub-gray histogram.

3. The production monitoring and analysis method based on the image data algorithm according to claim 1, wherein a specific expression of the adjustment of the gray level in the sub-gray histogram is as follows:

$$R = \frac{\sum (n_q - T_i)}{L}$$

wherein R represents the adjustment of the gray level in the sub-gray histogram, $T_i$ represents the lateral segmentation threshold of the sub-gray histogram, L represents the gray level interval corresponding to all the gray levels greater than the lateral segmentation threshold in the sub-gray histogram, and $n_p$ represents all the gray levels greater than the lateral segmentation threshold in the sub-gray histogram.

4. The production monitoring and analysis method based on the image data algorithm according to claim 1, wherein a method for obtaining the corrected sub-gray histogram is as follows:

obtaining the corrected gray level according to the adjustment of the gray level in the sub-gray histogram, the lateral segmentation threshold of the sub-gray histogram, and all the gray levels greater than the lateral segmentation threshold; and obtaining the corrected sub-gray histogram according to the corrected gray level.

5. The production monitoring and analysis method based on the image data algorithm according to claim 1, wherein the enhanced gray image is determined by the following method:

calculating a union set of corrected sub-gray histograms to obtain a merged sub-gray histogram; and obtaining the enhanced gray image according to the merged sub-gray histogram.

\* \* \* \* \*